United States Patent Office 2,830,968
Patented Apr. 15, 1958

2,830,968

ORGANOSILICON RESINS

Harold A. Clark, Midland, Mich., assignor to Dow Corning Corporation, Midland, Mich., a corporation of Michigan No Drawing. Application May 27, 1955
Serial No. 511,770

3 Claims. (Cl. 260—46.5)

This invention relates to improved organosilicon resin compositions.

One of the perennial problems in the organosilicon resin art has been the relatively long time and high temperatures needed to cure these materials. Many plans have been devised to remedy this defect such as by employing especially strong catalysts like lead or alkali metal hydroxides. Whereas these materials tend to reduce the time and temperature of cure, they also tend to decrease the thermal stability of the resin as shown by poor flex and craze life. Another way of avoiding the difficulty is to substitute organic functional groups on the silicon so that the resin can be set by ordinary organic reactions. This method gives a faster cure time but inherently decreases the thermal stability of the resin due to the presence of larger amounts of organic materials. Consequently the problem of obtaining fast cure coupled with the maximum thermal stability at extremely high temperatures, that is above 250° C., has not heretofore been satisfactorily solved.

There are many advantages to faster cure for siloxane resins. The most obvious one is increase in the production rate of silicone-molded articles with the subsequent reduction in cost. Another advantage is the greater pickup of resin on a fabric which is being coated therewith. For example, a fast curing resin will adhere much more readily to a fabric which is being passed through the solution and as the cloth then goes through a curing tower the fast curing resin will tend to flow less and thus more of it will stay on the fabric.

It is the object of this invention to provide improved siloxane resin compositions which have a combination of fast cure and maximum thermal stability. Another object is to provide improved laminating and coating resins. Further objects and advantages will be apparent from the following description.

This invention relates to a composition of matter consisting essentially of an organopolysiloxane of the formula

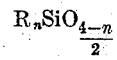
$$R_nSiO_{\frac{4-n}{2}}$$

in which R is a monovalent hydrocarbon radical and $n$ has an average value of from 1–1.7 inclusive, from .01–1% by weight based on the weight of the siloxane of a carboxylic acid salt of a quaternary ammonium hydroxide and from .001–2% by weight based on the weight of the siloxane of cerium added as an organic solvent soluble, carboxylic acid salt of cerium.

The compositions of this invention are prepared by merely mixing the three ingredients in any desired manner. In general, the resins are in solution in organic solvent and the catalysts are added thereto with stirring. The mixtures of this invention have a satisfactory shelf life.

Any monovalent hydrocarbon substituted organosiloxane having an average of from 1–1.7 hydrocarbon radicals per silicon atom is operative in this invention.

Thus the R groups can be any alkyl radical such as methyl, ethyl or octadecyl; any alkenyl radical such as vinyl, allyl, or hexenyl; any cycloaliphatic hydrocarbon radical such as cyclohexyl and cyclohexenyl; any aryl hydrocarbon radical such as phenyl, tolyl, xenyl and naphthyl and any aralkyl hydrocarbon radical such as benzyl. The siloxanes can be any combination of siloxane units of the type $RSiO_{3/2}$, $R_2SiO$, $R_3SiO_{1/2}$ and $SiO_2$ which will give the above-defined hydrocarbon radical to silicon ratio. Preferably the hydrocarbon radicals are methyl and phenyl.

The setting catalyst employed in the combination of this invention can be any carboxylic acid salt of a quaternary ammonium hydroxide. These compositions have the general formula $R'_4NOOCR''$. For the purpose of this invention R' can be any monovalent hydrocarbon radical such as alkyl radicals such as methyl, ethyl and octadecyl; alkenyl radicals such as vinyl, allyl and hexenyl; cycloaliphatic radicals such as cyclohexyl and cyclohexenyl; aryl hydrocarbon radicals such as phenyl, tolyl and xenyl; aralkyl hydrocarbon radicals such as benzyl and any hydroxylated hydrocarbon radical such as hydroxy ethyl, hydroxy propyl, hydroxy hexenyl, or hydroxy phenyl.

R'' can be any monovalent hydrocarbon radical such as alkyl radicals such as methyl, ethyl and octadecyl; any alkenyl radicals such as vinyl, allyl and hexenyl; any cycloaliphatic hydrocarbon radical such as cyclohexyl and cyclohexenyl; any aryl hydrocarbon radical such as phenyl, tolyl or xenyl and any aralkyl hydrocarbon radical such as benzyl. For the purpose of this invention the various radicals in the quaternary ammonium compound can be the same or different.

The stabilizer employed in the compositions of this invention is any organic solvent soluble, carboxylic acid salt of cerium. Thus specific examples of cerium salts which are operative herein are cerium octoate, cerium naphthenate, cerium stearate, cerium benzoate, cerium oleate, cerium naphthoate, cerium cyclohexoate, cerium adipate, cerium sebacate, cerium salicylate and cerium 12-hydroxy stearate.

It is preferred that the cerium salt be organic solvent soluble since it can then be adequately dispersed in the organic resin. In general salts having 4 or more carbon atoms fall within this category. If desired, more than one quaternary ammonium salt and more than one cerium salt may be employed in the compositions of this invention.

The compositions of this invention consist essentially of the above three ingredients. However, other nonessential ingredients may be present if desired. These include fillers such as commonly employed with organosilicon resins, pigments and traces of other metals which are normally employed in the bodying processes for siloxane resins or which are normal impurities in such resins. However, these latter metals should not be of the type which deleteriously affect the heat stability of the resins such as lead, alkali metals, aluminum and the like.

The compositions of this invention are characterized by short cure times of less than 1 hour at 150° C. and by extremely long flex and craze life at elevated temperatures. For example, a typical composition of this invention, where the resin is a methylphenylsiloxane resin, will cure in less than 1 hour at 150° C. and have a flex life upwards of 600 hours at 300° C. and a craze life upwards of 800 hours at 300° C. This combination of properties is a vast improvement over heretofore known catalyst combinations. Consequently the resins of this invention are especially suitable for molding, coating and for the production of laminates.

The following examples are illustrative only and should not be construed as limiting the invention which is properly delineated in the appended claims.

EXAMPLE 1

The siloxane resin employed in this example was composed of 21 mol percent monomethylsiloxane, 28 mol percent monophenylsiloxane, 37 mol percent dimethylsiloxane, 5 mol percent diphenylsiloxane and 9 mol percent phenylmethylsiloxane. One sample of this resin was prepared by cohydrolyzing the corresponding chlorosilanes and thereafter bodying the resin in solution in the absence of a metal catalyst. Another sample was prepared by hydrolysis of the chlorosilanes and thereafter bodied in the presence of .1 percent zinc added as zinc octoate. The term "bodying" means that the resin was heated in solution until the viscosity of the solution reached the desired point.

To a portion of the resin bodied without a metal was added .2 percent by weight trimethyl beta-hydroxyethyl ammonium 2-ethylhexoate and .1 percent by weight cerium added as cerium naphthenate. This composition is referred to as 1 in the table.

To a portion of the resin bodied in the presence of zinc octoate there was added .2 percent by weight trimethyl beta-hydroxyethyl ammonium 2-ethylhexoate. This composition is referred to as 2 in the table. To another portion of the zinc bodied resin was added .2 percent by weight trimethyl beta-hydroxyethyl ammonium 2-ethylhexoate and .2 percent by weight cerium added as the naphthenate. This composition is referred to as 3 in the table. These samples were all tested for curing, flex and craze as shown in the table below.

Table

| Composition | Cure in hrs. | Flex life in hrs. at 300° C. | Craze life in hrs. at 300° C. |
|---|---|---|---|
| Bodied with no metal | 9 hrs. at 200° C | 23 | 100 |
| 1 | Less than 1 hr. at 150° C. | 490 | 830 |
| Bodied with zinc octoate | 9 hrs. at 150° C | 160 | 175 |
| 2 | Less than 1 hr. at 150° C. | 150 | 200 |
| 3 | do | 640 | 1045 |

Note.—Catalyst combination 2 is outside the scope of the present claims and is included for comparison.

EXAMPLE 2

A resin having the composition 32.5 mol percent monophenylsiloxane, 30 mol percent phenylmethylsiloxane, 7.5 mol percent diphenylsiloxane and 30 mol percent monoethylsiloxane was mixed with .2 percent by weight trimethyl beta-hydroxyethyl ammonium 2-ethylhexoate and .2 percent by weight cerium added as cerium naphthenate. The craze life of the resin at 300° C. was substantially increased.

EXAMPLE 3

Equivalent results are obtained when a copolymer of 5 mol percent phenylvinylsiloxane, 25 mol percent monoamylsiloxane, 5 mol percent monooctadecylsiloxane, 25 mol percent monophenylsiloxane and 40 mol percent dimethylsiloxane is employed in the procedure of Example 2.

EXAMPLE 4

Equivalent results are obtained when the following catalyst combinations are employed in the procedure of Example 1.

Table

| Quaternary ammonium salt | Percent by wt. | Percent by wt. cerium | Cerium salt |
|---|---|---|---|
| β-hydroxyethylbenzyldimethyl ammonium benzoate. | 0.3 | 1.0 | Cerium benzoate. |
| Benzyltrimethylammonium acetate. | 0.1 | 0.3 | Cerium adipate. |
| Tris β-hydroxyethyl ethyl ammonium stearate. | 1.0 | 0.5 | Cerium naphthoate. |
| Tetraethyl ammonium cyclohexoate. | 0.5 | 0.3 | Cerium 2-ethylhexoate. |
| Phenylvinyldimethyl ammonium naphthenate. | 0.5 | 0.2 | Cerium 12-hydroxystearate. |

That which is claimed is:

1. A composition of matter consisting essentially of an organopolysiloxane resin of the formula $$R_n SiO_{\frac{4-n}{2}}$$

in which R is a monovalent hydrocarbon radical and $n$ has an average value from 1–1.7 inclusive, from .01–1 percent by weight based on the weight of the siloxane of a carboxylic acid salt of a quaternary ammonium hydroxide and from .001–2 percent by weight cerium based on the weight of the siloxane, said cerium being added in the form of an organic solvent soluble, carboxylic acid salt of cerium.

2. A composition of matter consisting essentially of an organopolysiloxane of the formula $$R_n SiO_{\frac{4-n}{2}}$$

in which R is selected from the group consisting of methyl and phenyl radicals and $n$ has an average value from 1–1.7 inclusive, from .01–1 percent by weight based on the weight of the siloxane of a carboxylic acid salt of a quaternary ammonium hydroxide and from .001–2 percent by weight of cerium based on the weight of the siloxane, said cerium being added as an organic solvent soluble, carboxylic acid salt of cerium.

3. A composition of matter consisting essentially of a methylphenylpolysiloxane having an average of from 1–1.7 total methyl and phenyl radicals per silicon atom, from .01–1 percent by weight based on the weight of the siloxane of a carboxylic acid salt of a quaternary ammonium hydroxide and from .001 to 2 percent by weight based on the weight of the siloxane of cerium added as cerium naphthenate.

References Cited in the file of this patent

UNITED STATES PATENTS

| 2,449,572 | Welsh | Sept. 21, 1948 |
| 2,518,160 | Mathes | Aug. 8, 1950 |
| 2,706,190 | Clark | Apr. 12, 1955 |